United States Patent [19]

Yano et al.

[11] Patent Number: 4,814,657
[45] Date of Patent: Mar. 21, 1989

[54] ENERGY CONVERTING DEVICE

[76] Inventors: Masafumi Yano, 1-301, Tokyo Daigaku Shokuin Shukusha, 1-170, Yayoicho, Chiba-shi, Chiba-ken, 260; Hiroaki Tanaka, 40-13-601, Honkomagome 3-chome, Bunkyo-ku, Tokyo, 113; Hiroshi Shimizu, 608, Yonbancho Jutaku, 8 Yonbancho, Chiyoda-ku, Tokyo, 102, all of Japan

[21] Appl. No.: 30,839
[22] PCT Filed: Aug. 14, 1986
[86] PCT No.: PCT/JP86/00418
§ 371 Date: Mar. 2, 1987
§ 102(e) Date: Mar. 2, 1987
[87] PCT Pub. No.: WO87/01249
PCT Pub. Date: Feb. 26, 1987

[30] Foreign Application Priority Data

Aug. 20, 1985 [JP] Japan .................. 60-181004

[51] Int. Cl.$^4$ .......................................... H02N 1/00
[52] U.S. Cl. .............................................. 310/309
[58] Field of Search ............ 310/309, 12, 15, 36, 310/40 R

[56] References Cited

U.S. PATENT DOCUMENTS

| | | | |
|---|---|---|---|
| 1,974,483 | 9/1934 | Brown | 310/309 X |
| 2,486,140 | 10/1949 | Felici | 310/309 |
| 2,617,976 | 11/1952 | Felici | 310/309 X |
| 2,656,502 | 10/1953 | Felici | 310/309 X |
| 2,662,191 | 12/1953 | Okey | 310/309 |
| 2,739,248 | 3/1956 | Meier | 310/309 |
| 3,107,326 | 10/1963 | Denholm | 310/309 X |
| 3,629,624 | 12/1971 | Staudte | 310/309 X |

FOREIGN PATENT DOCUMENTS 56-37104 4/1981 Japan .
56-141784 11/1981 Japan .

OTHER PUBLICATIONS

*Daigaku Katei Denjikigaku Enshu*, by Wakakuwa Mitsuo, Apr. 30, 1979, Shokodo (Tokyo) pp. 116–125.

Primary Examiner—Mark O. Budd
Attorney, Agent, or Firm—Bruce L. Adams; Van C. Wilks

[57] ABSTRACT

An energy converting device utilizes a plurality of variable capacitors each having a pair of electrodes and arranged at a predetermined spacing. An actuator is arranged to be slidable relative to the electrodes in the sliding direction. The actuator has a dielectric permittivity that varies periodically in the sliding direction to change the capacitance of the capacitors, during the sliding movement. A detector detects the position of capacitors relative to the actuator and a controller operates to charge or discharge the capacitors via the electrodes according to the detection of the capacitor position. The movement of the actuator produces a change in capacitance due to the displacement relative to the capacitors, and by charging/discharging the capacitors at a predetermined timing, electrical energy stored in the capacitors can be converted into mechanical energy or vice versa.

27 Claims, 25 Drawing Sheets

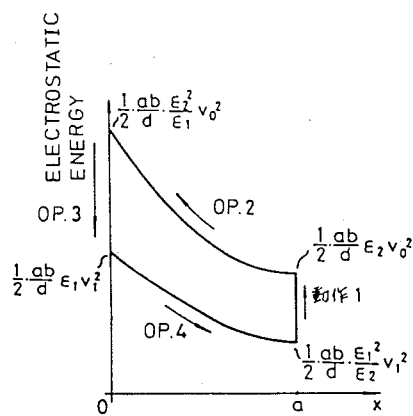 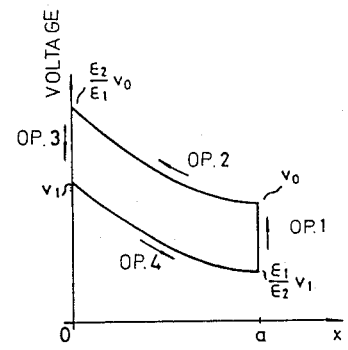
FIG.13(A)          FIG.13(B)
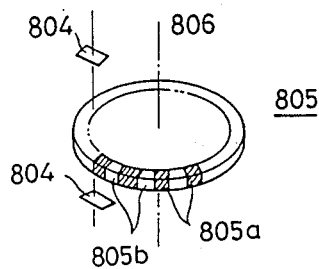
FIG.14

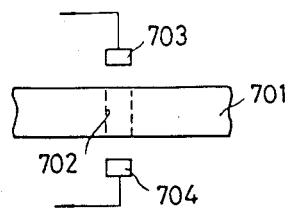
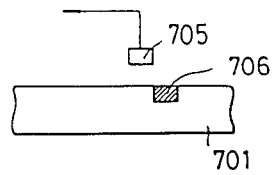
FIG 22          FIG 23
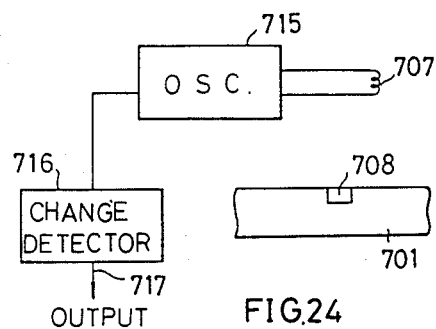
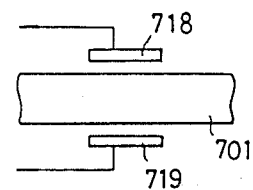
FIG.24          FIG.25
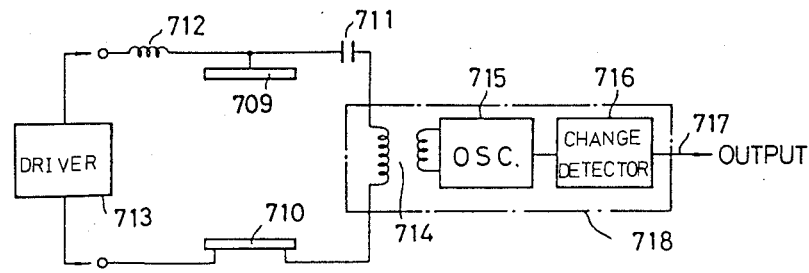
FIG.26

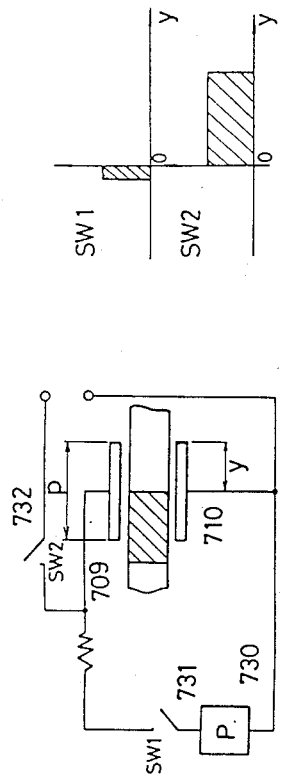
FIG.30
FIG.31
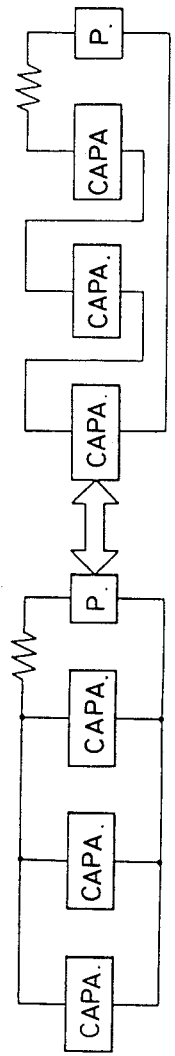
FIG.32

ENERGY CONVERTING DEVICE

FIELD OF THE INVENTION

This invention relates to an energy converting device, and particularly to an energy converting device that utilizes electrostatic force.

DESCRIPTION OF THE PRIOR ART

Electromagnetic motors and electromagnetic generators are examples of energy converting devices that are conventionally known. An electromagnetic motor utilizes the electromagnetic force produced when a current is passed through a coil in a magnetic field, thereby converting electrical energy into mechanical energy. In an electromagnetic generator, mechanical energy is used to rotate a magnetic field and induce a voltage in a coil provided around the rotating magnetic field, which is drawn off as electric power, thereby converting mechanical energy into electrical energy.

With such conventional energy converting devices there arise the following problems.

An electromagnetic motor and an electromagnetic generator both require a coil and a magnetic material, because they each utilize an interaction between electric and magnetic fields, and in order to obtain a uniform output the number of electrodes used has to be increased, but because there is a limit as to how many electrodes can be used, a constant output is not obtained.

When attempting to achieve more compactness by reducing the size of the coils and the number of poles, because there are limitations with respect to the machining involved, there is a limit as to how the size can be made.

Even when attempts are made to reduce the size to the limit, the smaller the size becomes, the smaller the output, so it has not been possible to obtain an energy converting device that is both small in size and has sufficient output.

In order to generate standstill or holding torque it is necessary to maintain a constant flow of current, and the heat thus produced becomes a problem.

SUMMARY OF THE INVENTION

In order to solve the above problems, in accordance with this invention, a construction is employed wherein at least one pair of electrodes is used and a capacitor formed by the electrodes is coupled with an actuator in an appropriate positional relationship, and each such capacitor is charged or discharged at an appropriate timing, whereby electrical energy is converted into mechanical energy or mechanical energy is converted into electrical energy.

By employing the above construction, the electostatic force in accordance with Coulomb's law can be utilized to convert electrical energy into mechanical energy, or vice-versa, extremely easily.

In addition, photolithography and thin-film deposition technologies which are used in the production of semiconductor devices can be applied to the fabrication of the capacitors and actuators, facilitating the provision of a high density, highly compact energy converting device.

Because the capacitor and actuator also can be arranged in very close proximity to each other, it is possible to obtain sufficient output with a compact device.

By providing many small converting units in an energy converting device according to this invention, it becomes possible to obtain a large output not heretofore obtainable with a conventional electrostatic motor, and at the same time the efficiency can be increased by inserting a dielectric material between the capacitors. The voltage at which dielectric breakdown occurs can also be raised by applying a fluid to the sliding surface of the actuator and reducing the gap to 200 micrometers or less.

BRIEF DESCRIPTION OF THE DRAWINGS

FIGS. 13A and 13B are diagrams explaining the operating cycle in the case of a generator;

FIG. 14 is an explanatory diagram of a second embodiment according to this invention;

FIGS. 22 and 23 are explanatory views of a tenth and an eleventh embodiment according to this invention;

FIG. 24 is an explanatory view of a twelfth embodiment according to this invention;

FIGS. 25 and 26 are an explanatory diagram and a circuit diagram of a thirteenth embodiment according to this invention;

FIGS. 30 and 31 are a circuit diagram and a figure showing the operation of a sixteenth embodiment according to this invention;

FIG. 32 is a block diagram showing a method of increasing the efficiency; and

DETAILED DESCRIPTION OF THE INVENTION

Description of the Principle

Figure 2:
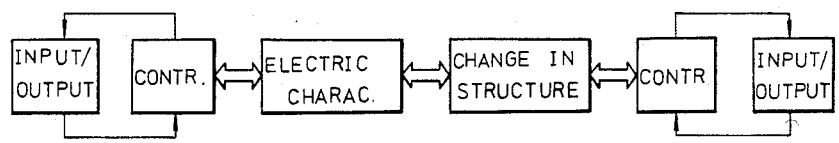
FIGS. 2A to 2L are explanatory diagrams of the basic principles.
Figure 2:
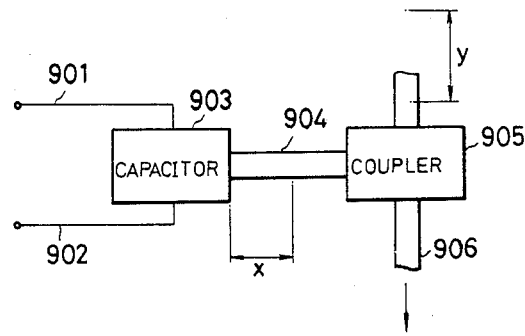

With reference to FIG. 2A, the basic principle of the present invention is that a capacitor forms the fundamental unit, the electrostatic capacity of the capacitor being varied by varying the structure thereof; the capacitors may be one in number or a plurality structurally coupled together, and by controlling at an appropriate point the conversion between electrostatic energy produced by the capacitor and mechanical energy, mechanical energy can be continuously derived from electrical energy, or vice-versa.

Figure 2C:
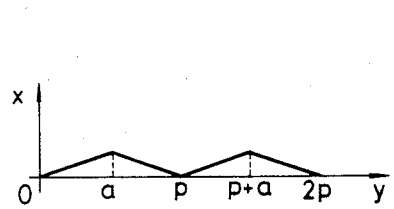

With reference to the basic concept as shown in FIG. 2B, 901 and 902 are terminals connected to the electrodes of a capacitor 903 the electrostatic capacity of which is varied by varying its structure, the structural variation being produced by the displacement of a coupling bar 904. The amount of the displacement of the coupling bar 904 is denoted by x. The numeral 905 denotes an adapter for coupling the coupling bar 904 to a mechanical device 906, the two members 904 and 906 being coupled to each other so that with respect to a displacement y of the mechanical device 906, x increases or decreases at a period p (FIG. 2C).

When the coupling bar 904 is displaced by x, if the capacity of the capacitor 903 is taken as c(x) and at this point there is a charge Q(x) on the capacitor 903, the electrostatic energy of the capacitor 903 is:

$$U(x) = \frac{1}{2} \cdot \frac{Q^2(x)}{C(x)}$$

Figure 2D:
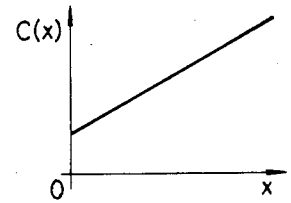

For simplicity, if the relationship of x and c(x) is regarded as a simple gain function, as shown in FIG. 2D, then:

$$\left( \frac{dC(x)}{dx} > 0 \right)$$

If the displacement of the coupling bar 904 is changed from x to x+Δx, if there is no change in the stored charge the electrostatic energy will only change by:

$$U(x + \Delta x) - U(x) = \frac{1}{2}Q^2(x)\left( \frac{1}{C(x + \Delta x)} - \frac{1}{C(x)} \right)$$

and an amount of mechanical energy equivalent to this quantity will be output or input via the coupling bar 904. That is to say, conversion takes place between electrostatic energy and mechanical energy. As:

$$\frac{dC(x)}{dx} > 0$$

with respect to an increase in x, $$U(x+\Delta x) - U(x) < 0 \text{ (with } \Delta x > 0\text{)};$$

and with respect to a decrease in x, $$U(x-\Delta x) - U(x) > 0 \text{ (with } \Delta x < 0\text{)}.$$

Thus, when the structural displacement of the capacitor (the displacement of the coupling bar 904) is changed from x to x+Δx, there is a decrease in the electrostatic energy of (Δx>0), and an equivalent amount of mechanical energy is output.

When a change of x−Δx is to be effected, if (Δx<0) it is necessary to provide mechanical energy from outside, at which point the electrostatic energy will increase.

When the amount of the structural displacement of the capacitor (the displacement of the coupling bar 904) is x, the force produced at this point x is given by the following equation.

$$F(x) = \frac{-dU(x)}{dx}$$

Figure 2E:
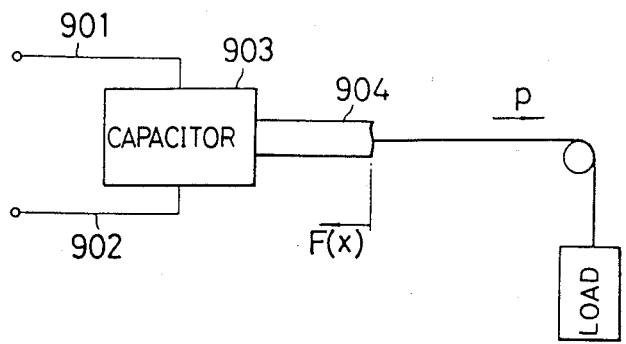

Here, when the load applied to the coupling bar 904 is p<F(x), the load is less than the force that is produced, so x increases and mechanical energy is output. When the applied load is F(x)<p, the load is greater than the force produced, so x decreases and there is an increase in the electrostatic energy (FIG. 2E). The former is a motional effect and the latter is generational effect.

As x changes periodically relative to changes in y (FIG. 2C), with respect to a space np≦y<np+a, x is a gain function in y and a loss function the space np+a≦y<(n+1)p (n is a desired integer, 0<a<p).

Figure 2F:
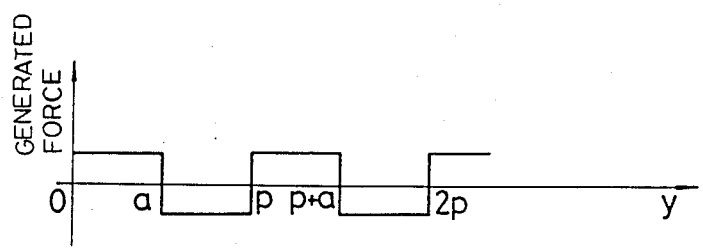

Therefore, if y is increased continuously, at np≦y<np+a, x increases with respect to the increase of y, so energy is produced and there is a motional effect, but at np+a≦y<(n+1)p, x decreases as y increases, so energy has to be supplied, and there is a generational effect (FIG. 2F).

Figure 2G:
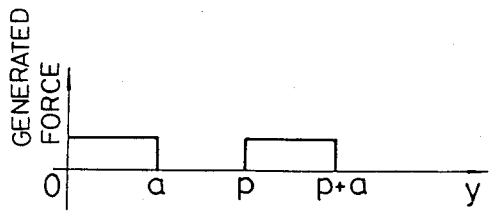

However, the magnitude of the energy that is input/output in accordance with the displacement of the coupling bar 904 is proportional to the square of the charge ($Q(x)^2$). Therefore, if when y is increased, charging of the capacitor is conducted at motional effect sections and discharging at generational effect sections, with respect to an increase in y, energy is generated when np≦y<np+a, and when np+a≦y<(n+1)p, no energy needs to be supplied, and the motional effect alone may be utilized (FIG. 2G). If this is reversed, when np≦y<(np+a) no force is produced, and when np+a≦y<(n+1)p, generation takes place and the generational effect alone can be utilized.

Figure 2H:
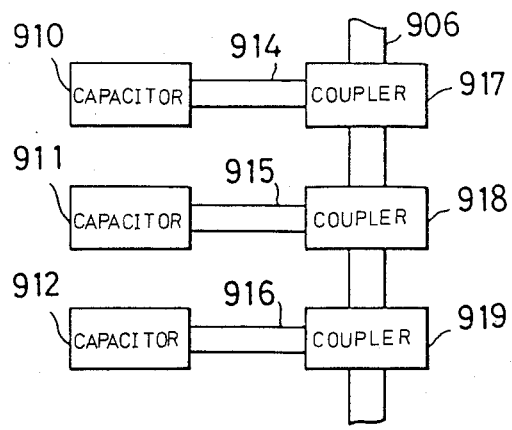
Figure 2I:
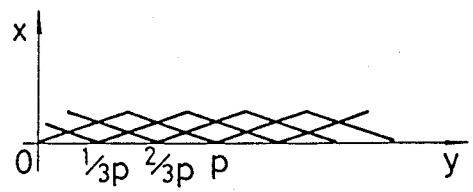
Figure 2J:
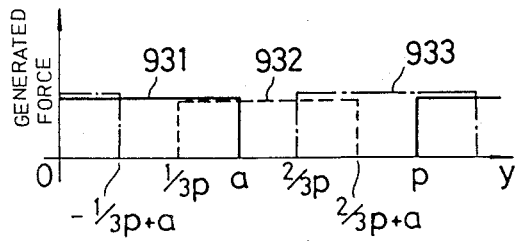

A plurality of capacitors is employed to provide smooth, continuous operation as a motor. As shown in FIG. 2H, a number of capacitors (three, in the example shown in the figure) 910, 911 and 912 are connected with respect to the mechanical device 906. Here, as shown in FIG. 2I, the connection is such that the displacement y of the mechanical device 906 is phased with displacement of coupling bars 914, 915 and 916 by one-third of a period. Thus, it becomes possible for the motional effect arising in the capacitors to be produced continuously with respect to y (FIG. 2J), enabling power to be taken off smoothly and continuously. The numerals 931 to 933 denote the power produced by the respective capacitors 914 to 916. Using the same structure when the device is being utilized as a generator enables a smooth conversion or exchange of energy to take place.

Figure 2K:
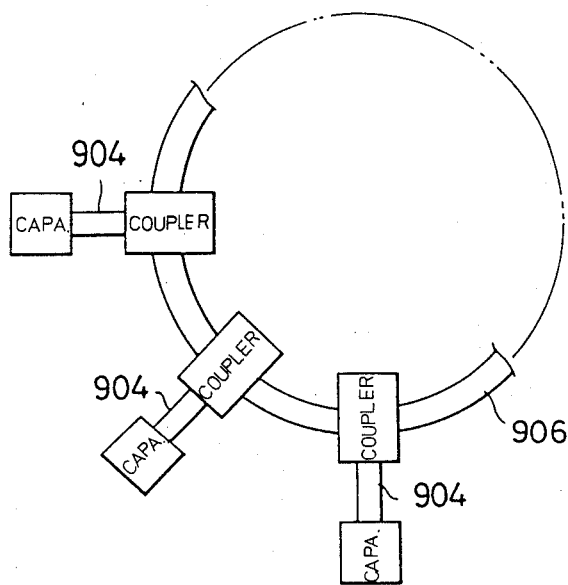

The mechanical device 906 is not limited to the linear type structure shown in FIG. 2H; it may for example be round in shape, such as in FIG. 2K, which will enable energy conversion to proceed continuously.

Hereinbelow the mechanical device 906 for taking off or transmitting the mechanical energy will be referred to as the "actuator", and the portion of the device which is stationary relative to the actuator will be referred to as the "stator."

The operating principles will now be described.

Figure 2L:
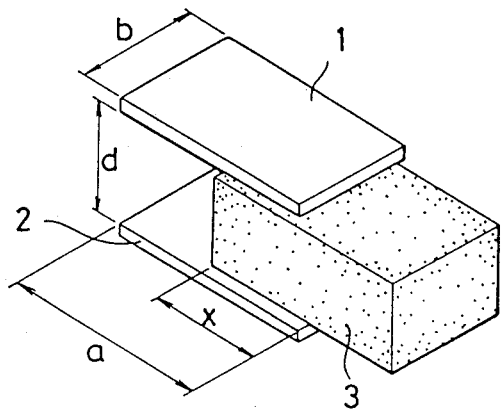

FIG. 2L shows one example of a variable capacitor the electrostatic capacitance of which is changed by changes in the structure thereof. In the figures the numerals 1 and 2 denote electrodes the length of which is a, the width of which is b, and which are separated by a space d. The two electrodes are disposed a fixed distance apart, and slidably disposed therebetween in a dielectric member 3.

If the dielectric member 3 has a high permittivity $\epsilon_2$ and the portion of the dielectric member between the electrodes 1 and 2 has a low permittivity $\epsilon_1$, and the length of the high permittivity portion drawn into the space between the electrodes 1 and 2 is x, the capacitor capacity is:

$$C(x) = \frac{(a-x)b}{d}\epsilon_1 + \frac{bx}{d}\epsilon_2$$
$$= \frac{ab}{d}\epsilon_1 + \frac{bx}{d}(\epsilon_2 - \epsilon_1)$$

Operation of the device as a motor will now be described. In FIGS. 5A to 5D, which refer to the operating principle in the case of a motor, portions identical to those of FIG. 2L are denoted by the same numerals, and the description thereof is omitted.

Figure 5A:
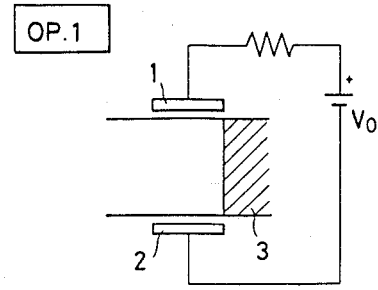
FIGS. 5A to 5D are explanatory diagrams showing the operating principle in the case of a motor.

With reference to FIG. 5A, charging is performed by applying a voltage $V_0$ across the electrodes 1 and 2 with the high permittivity portion, i.e. the dielectric 3, at the right-hand end of the electrodes 1 and 2 (x=0). At this point the charge Q(0) and the electrostatic energy U(0) will become:

$$Q(0) = C(0) \cdot V(0) = \frac{ab}{d}\epsilon_1 \cdot V_0$$
$$U(0) = \tfrac{1}{2}C(0) \cdot V_0^2 = \tfrac{1}{2} \cdot \frac{ab}{d}\epsilon_1 \cdot V_0^2$$

In this state, the electric field produced from the electrodes 1 and 2 expands to include the dielectric 3, and the dielectric 3 starts to be drawn into the space between the electrodes 1 and 2.

Figure 5B:
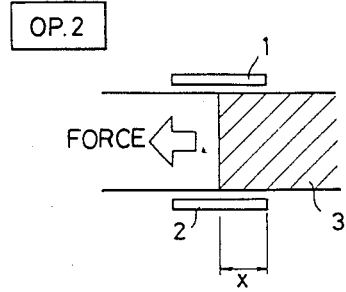

With reference to FIG. 5B, at this point the voltage that is being applied across the electrodes 1 and 2 is switched off by a switch means. The dielectric 3 has been drawn into the space between the electrodes 1 and 2 by a distance x according to the force produced in the direction indicated by the arrow in FIG. 5B.

As the chage at this time is maintained at just the charge applied in the FIG. 5A state, charge Q(x) is constant, as follows.

$$Q(x) = \frac{ab}{d}\epsilon_1 \cdot V_0$$

With the insertion of the dielectric 3 there is a reduction in the electrosatic energy. The electrostatic energy U(x) can be expressed as a function of x, thus:

$$U(x) = \tfrac{1}{2} \cdot \frac{Q(x)^2}{C(x)} = \tfrac{1}{2} \cdot \frac{\left(\frac{ab}{d}\epsilon_1 \cdot V_0\right)^2}{\frac{ab}{d}\epsilon_1 + \frac{b}{d} \times (\epsilon_2 - \epsilon_1)}$$
$$= \frac{1}{2d} \cdot \frac{a^2 b \epsilon_1^2 V_0^2}{a\epsilon_1 + x(\epsilon_2 - \epsilon_1)}$$

The force F(x) produced with respect to this movement of the dielectric can be represented by the following equation.

$$F(x) = \frac{-dU(x)}{dx}$$
$$= \frac{-d}{dx} \cdot \left\{ \frac{1}{a\epsilon_1 + x(\epsilon_2 - \epsilon_1)} \cdot \frac{b}{2d}(a^2\epsilon_1^2 V_0^2) \right\}$$
$$= \frac{\epsilon_2 - \epsilon_1}{\{a\epsilon_1 + x(\epsilon_2 - \epsilon_1)\}^2} \cdot \frac{b}{2d}(a^2\epsilon_1^2 V_0^2)$$

And, the voltage V(x) between the electrodes 1 and 2 can be represented thus:

$$V(x) = \frac{Q(x)}{C(x)} = \frac{\frac{ab}{d}\epsilon_1 V_0}{\frac{ab}{d}\epsilon_1 + \frac{bx}{d}(\epsilon_2 - \epsilon_1)}$$
$$V(x) = \frac{\epsilon_1 V_0}{\epsilon_1 + \frac{x}{a}(\epsilon_2 - \epsilon_1)}$$

Figure 5C:
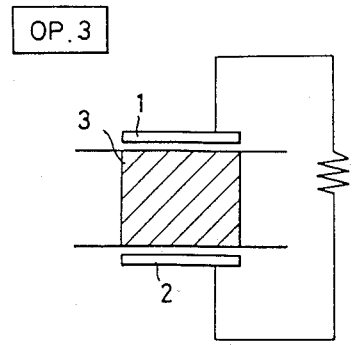

When the dielectric 3 has been drawn completely in between the electrodes 1 and 2, the electrodes 1 and 2 are short-circuited (FIG. 5C). As a result, the charge held between the electrodes 1 and 2 disappears and the electrostatic energy becomes zero.

At this point, Q=0, U=0, V=0.

Figure 5D:
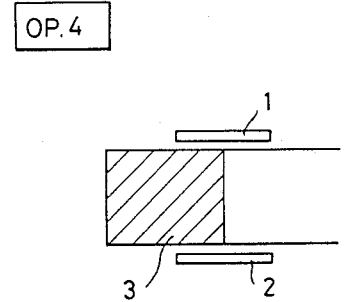

If at this time another capacitor is charged, via the actuator, with the positional relationship being as shown in FIG. 5A, the dielectric 3 will be drawn out from between the electrodes 1 and 2, as shown in FIG. 5D. As at this point Q=0, U=0, V=0, no negative force tending to draw it back is produced.

Figure 6A:
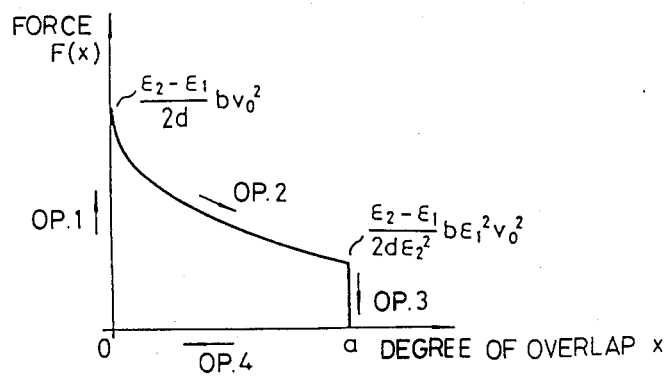
FIGS. 6A to 6C are figures explaining the operating cycle.
Figures 6B, 6C:
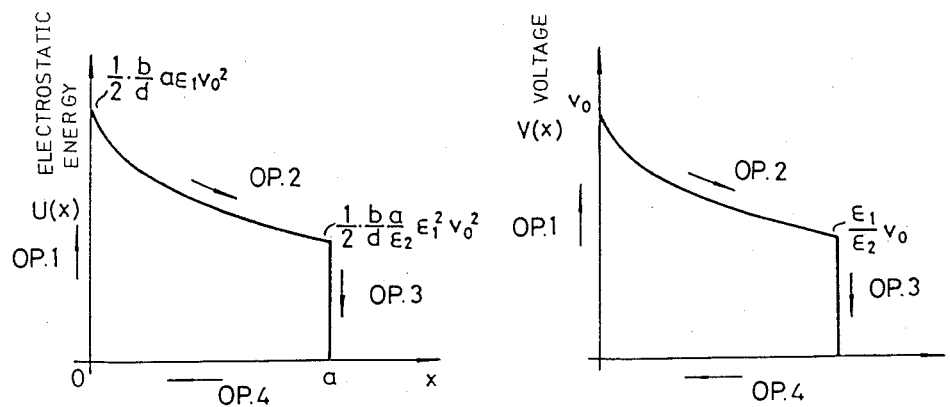

FIGS. 6A to 6C show the operating cycle, in the case of a motor, in graphical terms.

If however the voltage applied across the electrodes in the state depicted in FIG. 5B is maintained, as the voltage applied to the electrodes remains constant, the electrostatic energy U(x) will be:

$$U(x) = \tfrac{1}{2}C(x)V_0^2$$
$$= \left\{\frac{ab}{d}\epsilon_1 + \frac{bx}{d}(\epsilon_2 - \epsilon_1)\right\}\tfrac{1}{2}V_0^2$$

And, the force F(x) that is produced can be shown as:

$$F(x) = \frac{d}{dx} U(x) = \frac{1}{2} \cdot \frac{b}{d} (\epsilon_2 - \epsilon_1)V_0^2$$

Figures 7A, 7B:
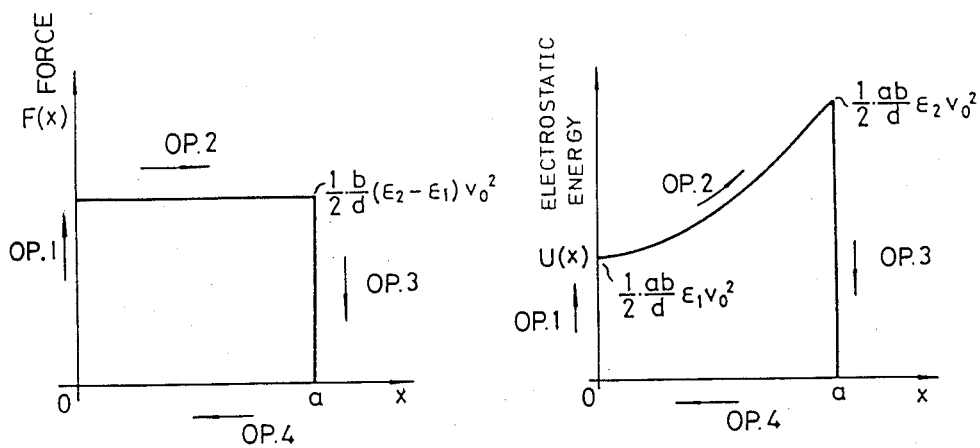
FIGS. 7A and 7B are figures explaining the operating cycle during constant torque operation.

As a result, the operating cycle becomes as shown in FIGS. 7A and 7B. Thus, such a driving system is suitable for a constant output drive, but as the amount of energy that is lost by the operation shown in FIG. 5C increases, there is a deterioration in the efficiency.

Figure 8:
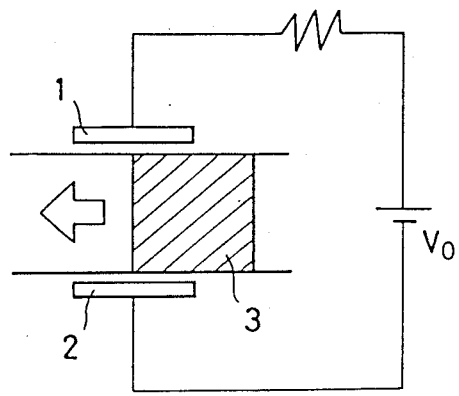
FIG. 8 is an explanatory diagram showing another drive system in the case of a motor.

Also, if in the course of the motion shown in FIG. 5B a connection is made to an electric power source, via a resistance of an appropriate value, i.e. as shown in FIG. 8, and if the resistance is large, there may be considered shutting off the power source at the approximate instant the dielectric 3 slips (moves), and reconnecting it when the slip has stopped.

Figure 9:
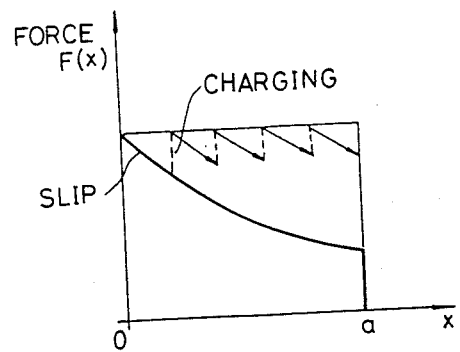
FIGS. 9 and 10 are explanatory figures showing the operating cycle of another drive system in the case of a motor.
Figure 10:
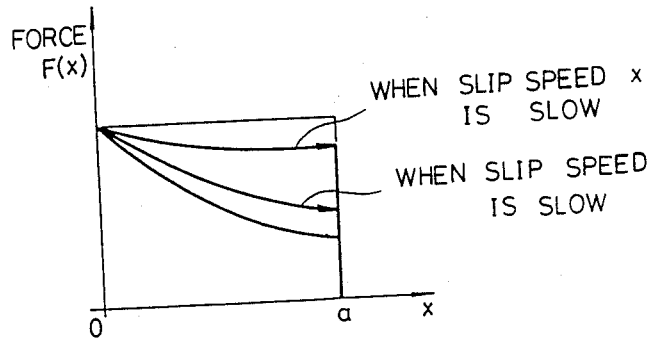
Figure 11:
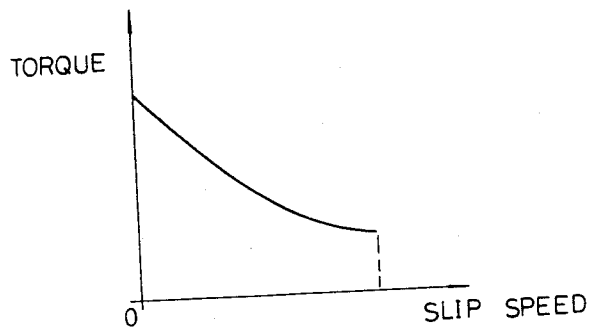
FIG. 11 is a figure showing the relationship between torque and slip speed.

The consequent force F(x) will be as shown in FIG. 9. If this phenomena is produced continuously, force F(x) would become as shown in FIG. 10. This indicates that, as shown in FIG. 11, torque will decrease as the slip speed increases.

The operation of the device as a generator will now be described, with reference to FIGS. 12A to 12D.

Figure 12A:
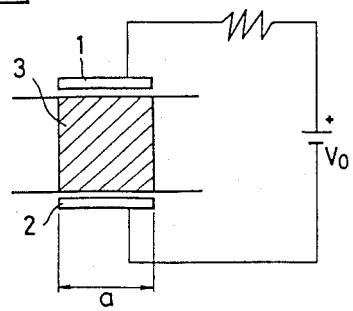
FIGS. 12A to 12D are diagrams explaining the operating principle in the case of a generator.

With reference to FIG. 12A, when the dielectric 3 positioned between the electrodes 1 and 2 is charged by a voltage $V_0$ applied across the electrodes 1 and 2, charge Q and electrostatic energy U can be expressed as follows.

$$Q(a) = \frac{ab}{d} \epsilon_2 V_0$$

$$U(a) = \tfrac{1}{2} C(a) \cdot V_0^2$$

$$= \tfrac{1}{2} \cdot \frac{ab}{d} \epsilon_2 V_0^2$$

Figure 12B:
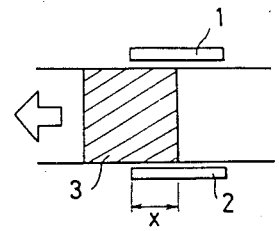
Figure 12C:
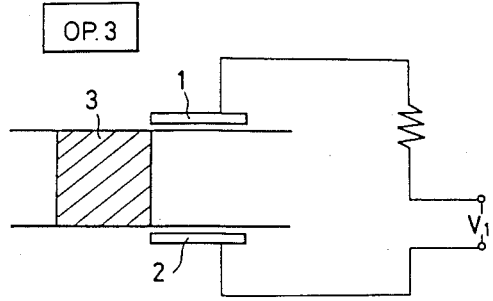
Figure 12D:
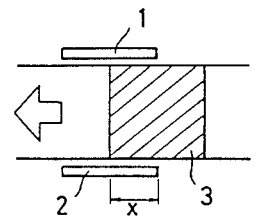

If in this state the supply of power to the electrodes is cut off, as shown in FIG. 12B an external force is applied and the dielectric 3 is withdrawn from between the electrodes 1 and 2.

If at this time it is assumed that the length by which the dielectric 3 is inserted between the electrodes 1 and 2 is x, electrostatic energy U(x) and voltage V(x) can be expressed as:

$$U(x) = \tfrac{1}{2} \cdot \frac{Q(x)^2}{C(x)}$$

$$= \tfrac{1}{2} \cdot \frac{\frac{b}{d}(a^2 \epsilon_2^2 V_0^2)}{a\epsilon_1 + x(\epsilon_2 - \epsilon_1)}$$

$$V(x) = \frac{\epsilon_2 V_0}{\epsilon_1 + \frac{x}{a}(\epsilon_2 - \epsilon_1)}$$

The result of the withdrawal of the dielectric 3 and the decrease in x is that the electrostatic energy increases, and the voltage between the electrodes 1 and 2 increases. In that state, by connecting the electrodes 1 and 2 on the output terminal side, the electrode charge can be taken off as output voltage $V_1$.

As a result, Q(0) and U(0) become:

$$Q(0) = \frac{ab}{d} \epsilon_1 V_1$$

$$U(0) = \tfrac{1}{2} \cdot \frac{ab}{d} \epsilon_1 V_1^2$$

Following the discharge, the dielectric is drawn into the space between the electrodes by the force produced by the charge remaining on the electrodes, and as a result U(x) and V(x) become:

$$U(x) = \tfrac{1}{2} \cdot \frac{\frac{b}{d} a^2 \epsilon_1^2 V_1^2}{a\epsilon_1 + x(\epsilon_2 - \epsilon_1)}$$

$$V(x) = \frac{\epsilon_1 V_1}{\epsilon_1 + \frac{x}{a}(\epsilon_2 - \epsilon_1)}$$

Generation is effected by a repetition of the above operation.

The operating cycle is as shown by FIGS. 13A and 13B.

Figure 3A:
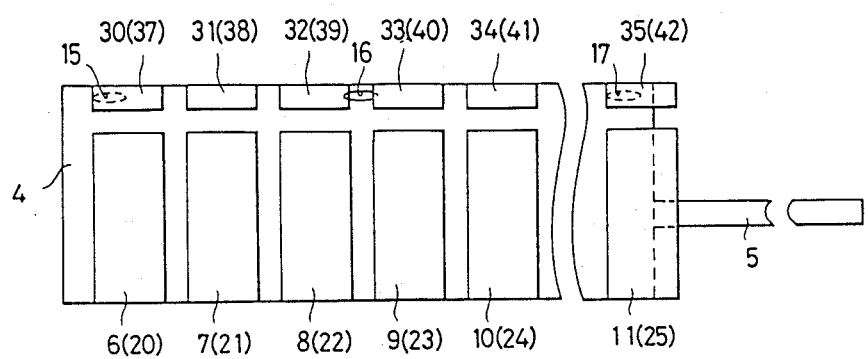
FIGS. 3A to 3C are a plan view, front view and side view, respectively, showing the structural principles.
Figure 3B:
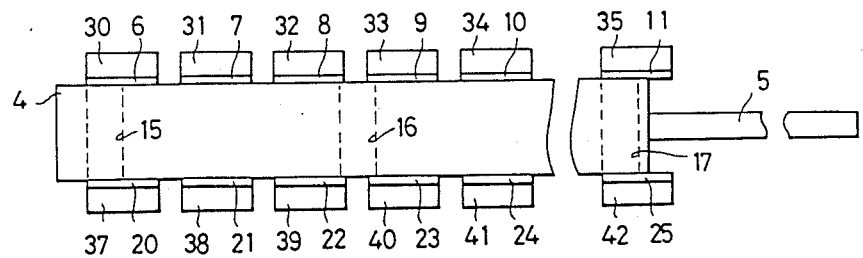
Figure 3C:
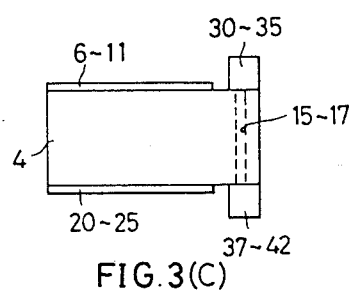

FIGS. 3A, 3B and 3C show a specific example of the basic structure of a motive device which utilizes the present invention. FIGS. 3A, 3B and 3C the numberal 4 denotes an actuator formed from dielectric sheet and having a permittivity $\epsilon$ the period of which varies as shown by a triangular waveform in FIG. 4B. That is:

$$\epsilon(x) = \left\{ \frac{\epsilon_2 - \epsilon_1}{\frac{p}{2}} (x - np) + 2\epsilon_1 - \epsilon_2 \right\} \{((n + 1/2)p < x > (n + 1)p)\}$$

(Here, n is a desired integer.)

The actuator 4 is formed therein, at for example, positions (11/18+i)p (i being a desired interger) along its lengthwise direction with holes 15 to 17 each of which is 1/9p in length, and one end of the actuator 4 is provided with a transmitting means 5 for the purpose of, for example, power or mechanical energy transmission.

Figure 4A:
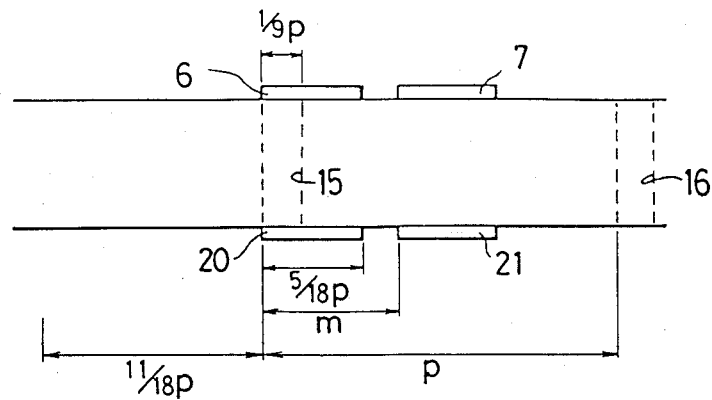
FIGS. 4A to 4C are, respectively, an explanatory diagram of the structure of the principle portions, a figure showing the permittivity distribution, and a circuit diagram explaining the operation.
Figure 4B:
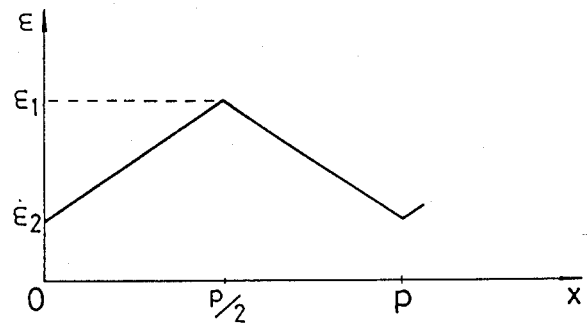

Provided above and below the actuator 4 are electrodes 6 to 11 and 20 to 25. The length of each of these electrodes is 5/18p, the width is b, and as shown in FIG. 4A, they are arrayed at a spacing or interval m.

Also, at one side across the width direction of the actuator 4, and in a position in which they are facing the holes 15 to 17, are provided photo-receptor elements 30 to 35 on the upper side of the actuator 4 and light-emitting elements 37 to 42 on the lower side thereof. The length of each of these elements is 5/18p, and they detect the position of the dielectric actuator 4 relative to the electrodes, and detect whether the relative permittivity of the dielectric actuator 4 has increased or decreased.

Figure 4C:
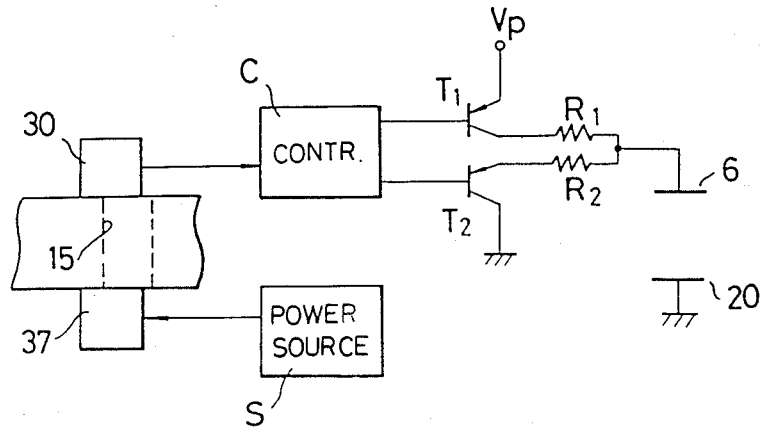

As shown in FIG. 4C, each of the electrodes is connected to a power source of voltage Vp, via a switching transistor $T_1$ and a resistance $R_1$, and also via a switching transistor $T_2$ and a resistance $R_2$. The switching transistors $T_1$ and $T_2$ are driven by a control circuit C. In the figure, S denotes a power source for the light-emitting elements.

The above circuit is configured so that when the position of the holes for the detection of the position of the actuator 4 is detected by the photo-receptor elements and the light-emitting elements, the circuit is made through the switching transistor $T_2$, and at all other times the circuit is made through the switching transistor T$_1$.

If the array pitch ratio of the electrodes and the dielectric actuator is a simple integer the operation will be like that of a stepping motor, while if the array pitch ratio is an irrational number, the operation of the motor becomes extremely smooth.

Semiconductor manufacturing technology can be utilized for the electrodes and high-permittivity dielectric portions, so it is possible to form arrays of very high density, so that in the case of stepping motor operation, it is possible to achieve extremely fine steps. In the case of an ordinary motor, output delivery is smooth with very little variation.

Embodiments of the present invention will now be described hereinbelow with reference to the accompanying drawings.

EMBODIMENT 1

Figure 1:
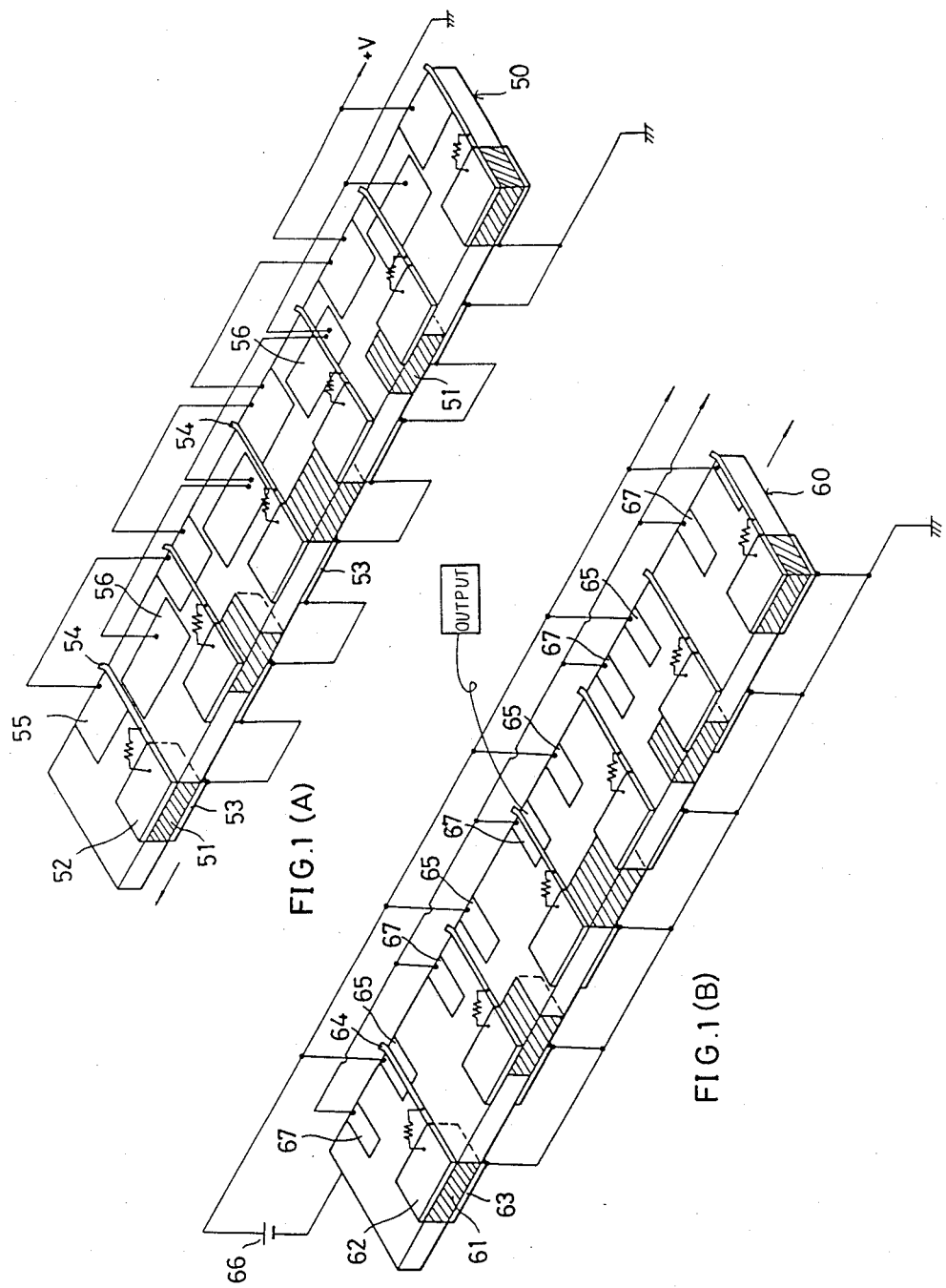
FIGS. 1A and 1B are explanatory perspective views of the device according to a first embodiment of the present invention, when applied to a motor and a generator, respectively.

With reference to a motor as shown in FIG. 1A, the numeral 50 denotes a dielectric sheet member, while 51 denotes high-permittivity portions arrayed at a prescribed pitch. Numerals 52 and 53 denote electrodes, each electrode 52 having a brush 54 and each electrode 53 being grounded. Also 55 denotes a +V electrode and 56 denotes a ground electrode. The direction of movement of the dielectric sheet 50 is as indicated by the arrow, i.e. in the figure is toward the left.

As depicted in the figure, the dielectric (the high-permittivity portion) at the left-hand end is between the electrodes 52 and 53 and the brush is in a break state, so no force is produced.

The second dielectric 51 from the left is between the electrodes 52 and 53 and the brush is connected to the +V line, producing a force. With reference again to the state as shown in FIG. 1A, if a dielectric 51 is moved one-half pitch to the left, the electrode state will become the same as the one immediately to the left of the one currently shown.

With the above construction, as described with respect to the operating principle, the dielectric sheet 50 moves to the left in operation as a linear motor.

The generator shown in FIG. 1B will now be described. In FIG. 1B, the numeral 60 denotes a dielectric sheet and 61 denotes high-permittivity portions. Numerals 62 and 63 denote electrodes, each electrode 62 being provided with a brush 64. Numeral 65 denotes excitation electrodes which are connected to a low-voltage excitation power source 66. Numeral 67 denotes output electrodes which are connected on the busbar side. In the figure the arrow indicates the direction of movement of the dielectric sheet 60, i.e. towards the right. In that state, operation proceeds as shown in FIGS. 12A to 12D, generating electricity.

EMBODIMENT 2

With reference to FIG. 14, this embodiment comprises a single pair of stator electrodes 804 and an actuator 805 the circumference of which is provided at regular intervals with dielectrics 805a and 805b which have different permittivities. The actuator 805 has an axis of rotation 806. when at a certain point a force is produced that produces motion, the inertia is utilized to cause the actuator 805 to rotate. Continuous motion can be produced by repeated charging and discharging at appropriate positions.

EMBODIMENT 3

Figure 15:
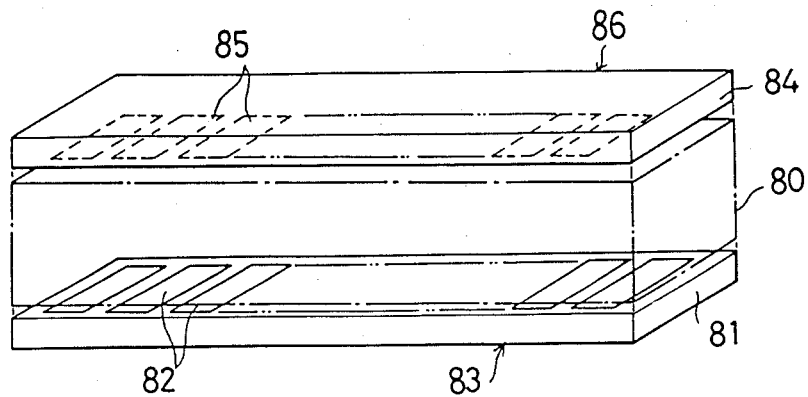
FIG. 15 is an explanatory diagram of a third embodiment according to this invention.

With reference to FIG. 15, in this embodiment, a stator 83 is comprised of electrodes 82 affixed in a regular arrangement to a substrate 81. The actuator 86 is comprised of electrodes 85 arranged at a prescribed regular spacing on a substrate 84. In this case, when the dielectric 80 is positioned between the stator electrodes and the actuator electrodes, energy conversion efficiency is improved. The dielectric may be a liquid, or a solid that can be affixed to the actuator electrodes.

EMBODIMENT 4

Figure 16:
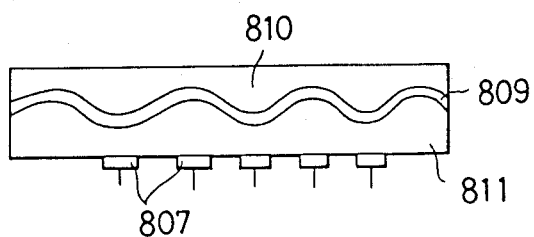
FIG. 16 is an explanatory diagram of a fourth embodiment according to this invention.

This embodiment, which is shown in FIG. 16, is comprised of a regular arrangement of stator electrodes 807 and an actuator 810. To the stator side of the actuator 810 is affixed an electrode 809 such that the gap between the electrode 809 and the stator electrodes 807 has a regular variation. A liquid or solid dielectric 811 may be provided in the space between the electrodes.

EMBODIMENT 5

Figure 17:
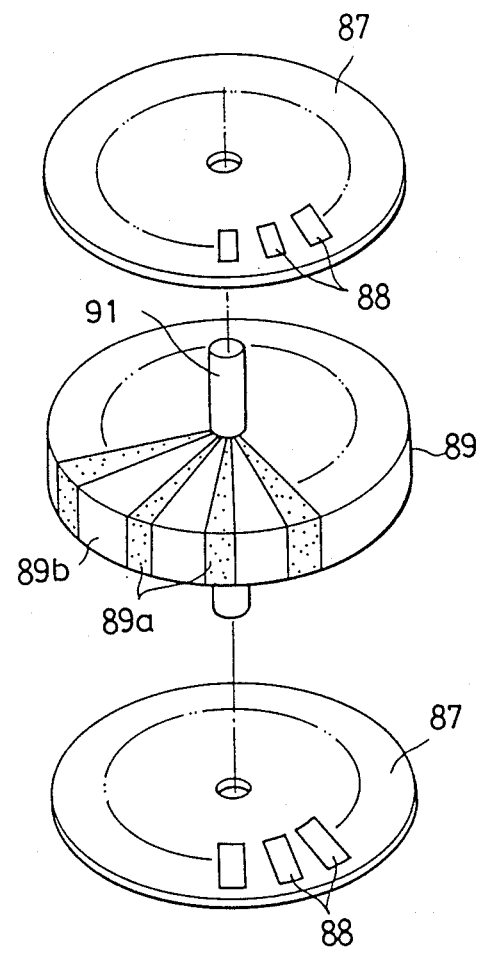
FIG. 17 is an explanatory diagram of a fifth embodiment according to this invention.

This embodiment is a disk-shaped rotating type, and is shown in FIG. 17. Here, a plurality of electrodes 88 is affixed radially at a prescribed pitch on a substrate 87 to form the stator. The actuator is a dielectric sheet, denoted here by the numeral 89, which is of approximately the same diameter as the substrate 87, and consists of a plurality of high-permittivity portions 89a and low-permittivity portions 89b arranged radially at a prescribed pitch.

It is possible to produce continuous motion by reducing the stator electrodes of Embodiments 1, 3 and 4 to one and repeatedly charging and discharging at appropriate positions to utilize the inertia of the electrostatically-induced motion.

It is also possible to use continuous electrodes in place of the stator electrodes of Embodiment 1, 2 and 6. In this case, the continuous electrode may be formed integrally with the actuator.

The stators and actuators of the above five embodiments may be formed also of a plurality of layers.

EMBODIMENT 6

Figure 18:
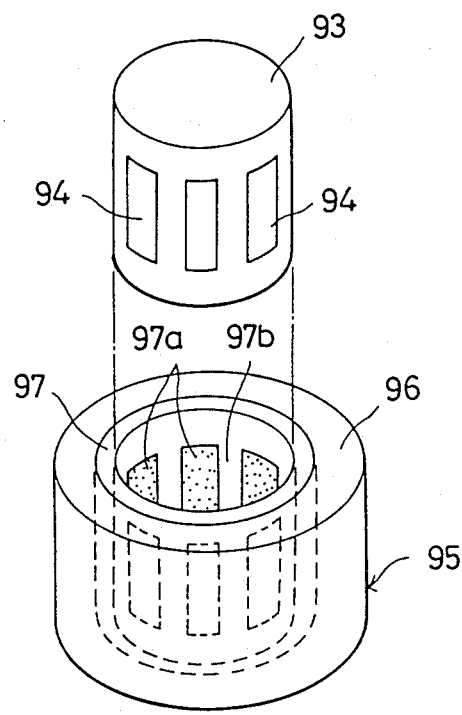
FIG. 18 is a perspective exploded view of a sixth embodiment according to this invention.

With reference to FIG. 18, this embodiment is a rotating cylinder type with a cylindrical stator 93 having around the circumference thereof a plurality of electrodes 94 fixed thereto at a prescribed angular spacing. Numeral 95 denotes an outer-rotor type actuator which is comprised of a cylindrical electrode 96, on the inner surface of which is affixed a cylindrical dielectric 97. The cylindrical dielectric 97 is comprised of a plurality of high-permittivity portions 97a and low-permittivity portions 97b arranged alternately at a prescribed angular spacing.

The example shown in FIG. 18 is an outer-rotor type, but an inner-rotor type may also be used. Both types, inner rotor and outer-rotor, may be multi-tiered in structure.

When a dielectric of a uniform permittivity is to be used for the cylindrical dielectric 97, the electrode 96 is divided into portions or segments of a specific size which are affixed at a prescribed spacing. It is also possible for the actuator and stator to be formed in alternating layers.

EMBODIMENT 7

Figures 19, 20:
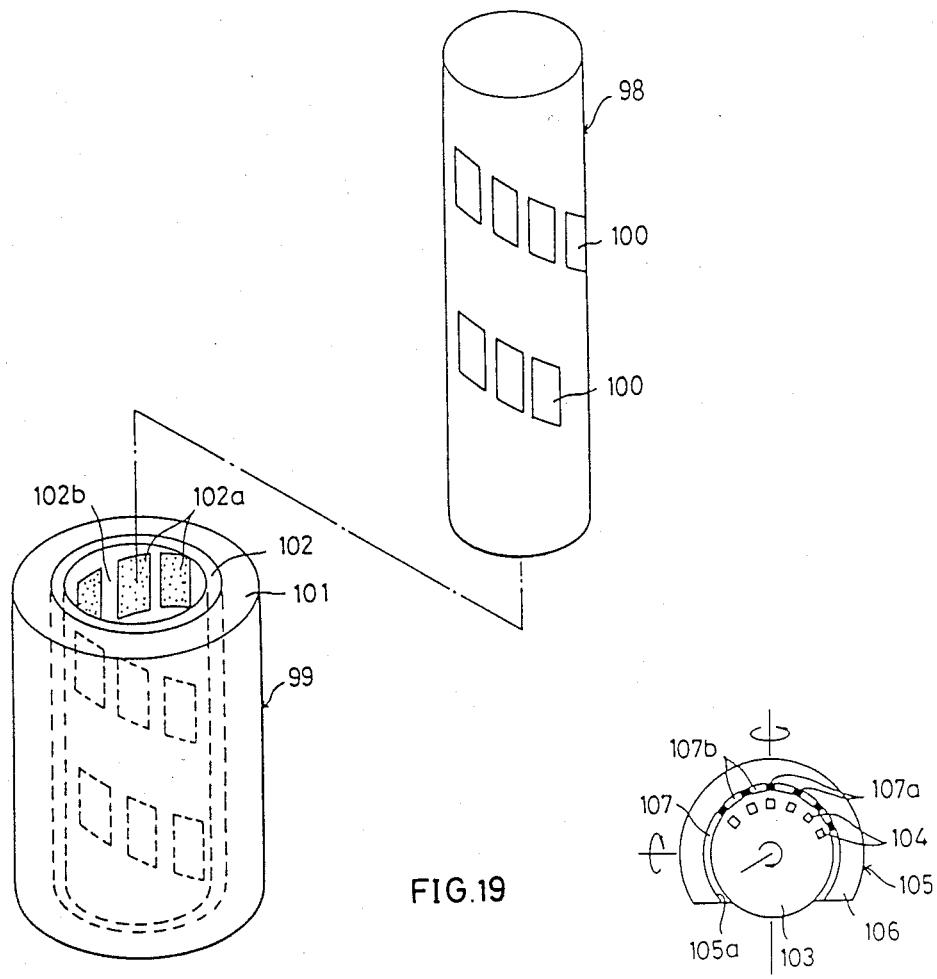
FIG. 19 is an explanatory diagram of a seventh embodiment according to this invention.
FIG. 20 is a sectional view of an eighth embodiment according to this invention.

This embodiment, shown in FIG. 19, is a spiral rotary-riser type. It comprises a stator 98 and a cylindrical actuator 99, and a plurality of electrodes 100 affixed to the surface of the stator 98 in a spiral array and at a prescribed pitch. The outer-rotor type actuator 99 consists of a cylindrical electrode 101 and a cylindrical dielectric 102, the cylindrical dielectric 102 also having a spiral array of high-permittivity portions 102a and low-permittivity portions 102b arranged thereon at a prescribed pitch.

Although in the figure this embodiment is shown as having an outer-rotor structure, an inner-rotor type structure also may be employed. The stator 98 and the actuator 99 may also have multiple arrays.

If a dielectric of a uniform permittivity is to be used for the cylindrical dielectric 102, the electrode 100 may divided into portions of a specific size which are affixed at a prescribed spacing.

EMBODIMENT 8

This embodiment, shown in FIG. 20, has a structure for three-dimensional operation. It comprises a ball-shaped stator 103 on which are affixed many electrodes 104 in a three-dimensional arrangement and at a prescribed pitch.

Around the stator 103 is provided a hollow, ball-shaped actuator 105 which can rotate three-dimensionally. The actuator 105 is comprised of an electrode 106 positioned on the outside thereof and a dielectric 107 which is positioned on the inside of the actuator 105. The dielectric 107 comprises high-permittivity portions 107a and low-permittivity portions 107b arrayed at a prescribed pitch.

When a dielectric of a uniform permittivity is used for the dielectric 107, the electrode 106 is arrayed at a prescribed pitch.

By employing this type of structure, an electrode at any desired position along the equator can be selected to drive the device, enabling complex, three-dimensional operation along a selectable axis of rotation.

An opening 105a is formed in one portion of the actuator 104 for the support for the stator 103. Although in the figure this embodiment is shown as having an outer-rotor structure, an inner-rotor type structure also may be employed.

The above embodiments may each be applied as a motor or as a generator.

EMBODIMENT 9

Figure 21B:
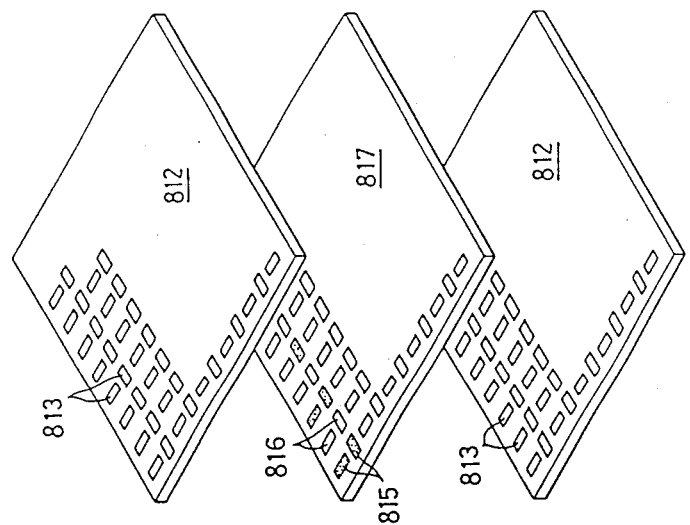
FIGS. 21A and 21B are perspective views of a ninth embodiment according to this invention.
Figure 21A:
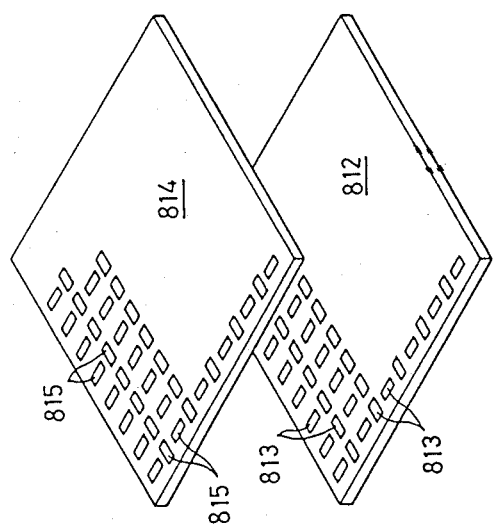

This embodiment, shown in FIG. 21A and 21B, is structured for two-dimensional operation. With reference to FIG. 21A, the embodiment is provided with a flat stator 812 on which are affixed a large number of electrodes 813 oriented or aligned in two directions and arrayed widthwise and lengthwise on the flat stator 812 at a prescribed pitch and with the electrodes of one orientation alternating with those of the other orientation adjacent thereto. The electrodes arrayed widthwise are used for motion in the width direction of the two-dimensional plane, and the electrodes arranged lengthwise are used for lengthwise motion.

The actuator 814 is likewise flat, and if a dielectric of a uniform permittivitiy is to be used, the electrodes 815 are affixed at a prescribed spacing.

Also, if as shown in FIG. 21B use is made of a combination of dielectrics 815 and 816 of differing permittivities to form the actuator 817, affixment thereof is at a prescribed pitch. If a number of layers are used, it is possible to use a combination of Embodiments 1, 3 and 4 so that one layer provides lengthwise motion and another widthwise motion.

EMBODIMENT 10

With reference to FIG. 22, this embodiment, uses an optical means of detecting the relative position of the actuator 701 and the stator, consisting of a photo-receptor element such as a photo-resistor 704 which detects whether light emitted by a light-emitting device such as a light-emitting diode 703 passes through a hole 702 in the actuator. Other optical means include one which utilizes changes in the light reflectance of the actuator, and another which uses light-emitting elements and light-receptor elements respectively provided on the actuator and the stator.

EMBODIMENT 11

With reference to FIG. 23, this embodiment uses a magnetic means of detecting the relative position of the actuator 701 and the stator consisting of a Hall element 705 to detect the magnetism of a magnet 706 affixed to the actuator 701.

EMBODIMENT 12

With reference to FIG. 24, this embodiment uses a method of detecting the relative position of the actuator 701 and the stator by detecting changes in the reactance of a small detection coil 707, produced by a substance 708 (metal for example) affixed to the actuator 701 which has a different permeance thereto as changes in the resonant frequency of an oscillator circuit 715.

EMBODIMENT 13

With reference to FIGS. 25 and 26, this embodiment uses an method of detecting the relative position of the actuator 701 and the stator by utilizing changes in the capacitance of a capacitor between the electrodes 718 and 719.

The capacitor may also be provided for detection purposes, separately from the main electrodes, or can be used for both purposes, such as shown in FIG. 26. Here, the virtually direct current operation of the circuit 713 which drives the main electrodes 709 and 710, is utilized. A coil 712 prevents the high-frequency signal used for detecting changes in capacity from entering the drive circuit 713, while the driving power source is shut off by a capacitor 711 from a capacity change detection circuit 718 consisting of a transformer 714, an oscillator circuit 715 and a frequency change detector 716.

EMBODIMENT 14

Figure 27:
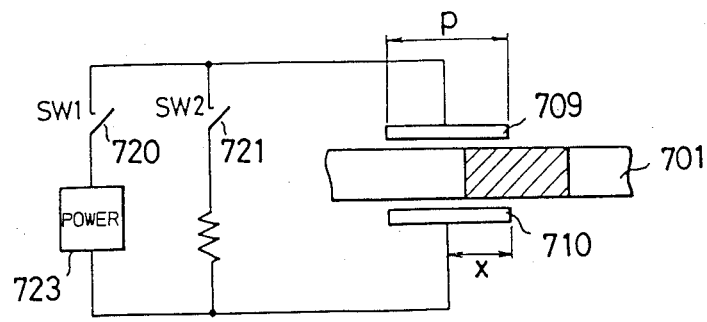
FIGS. 27 and 28 are a circuit diagram and a figure showing control operation of a fourteenth embodiment according to this invention.
Figure 28:
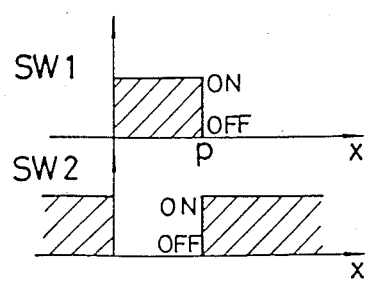

In this embodiment, with reference to FIG. 27 and FIG. 28, only when the capacitor is in a position in which the capacity thereof increases as the actuator moves ($0 \leq x < p$) is a constant voltage power source 723 is connected to the electrodes by the closing of a switch SW1 (720), and in other positions the electrodes are shorted out by the closing of switch SW2 (721), thereby enabling the production of power possessing constant torque characteristics.

EMBODIMENT 15

Figure 29:
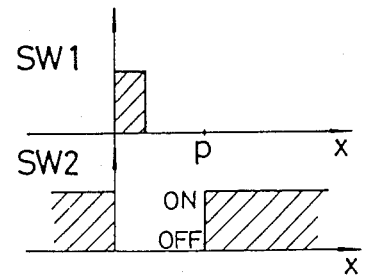
FIG. 29 is a figure showing control operation of a fifteenth embodiment according to this invention.

In this embodiment, with reference to FIG. 27 and FIG. 29, only when the capacitor is in a position in which the capacity thereof starts to increase as the actuator moves, a constant voltage power source 723 connected to the electrodes by the closing of a switch SW1 (720), and in positions where the capacity decreases the electrodes are shorted out by the closing of switch SW2 (721), thereby enabling the production of power possessing high-efficiency characteristics.

EMBODIMENT 16

In this embodiment, with reference to FIG. 30 and FIG. 31, a capacitor in a position immediately prior to when the capacity thereof is decreased by movement of the actuator is connected to an exciting power source 730 by the closing of a switch SW1 (731), so that excitation charging is caused by the excitation and the switch SW2 closes to make the connection to the output terminals, to thereby produce power.

In order to provide increased efficiency, the parallel capacitor arrangement may be switched to a series arrangement, as shown in FIG. 32, when the capacitors are connected to the power source or output terminal, and when shorting or excitation charging is performed.

EMBODIMENT 17

This embodiment relates to the dielectric, particularly to the use of high-permittivity dielectrics such as PTZ, barium titanate and other such high-permittivity ceramics, high-permittivity polymers such as ethylene trifluoride and polyvinylidene fluoride, or biopolymers such as actin.

Also, it is necessary for the electrodes to be very close to the dielectric in a proximity that is limited by contact therebetween. Therefore, it is preferable that a lubricant be applied to the contact surface of the electrode and the dielectric, consisting of fine particles of high-permittivity ceramics or high-permittivity polymers.

EMBODIMENT 18

Figure 33:
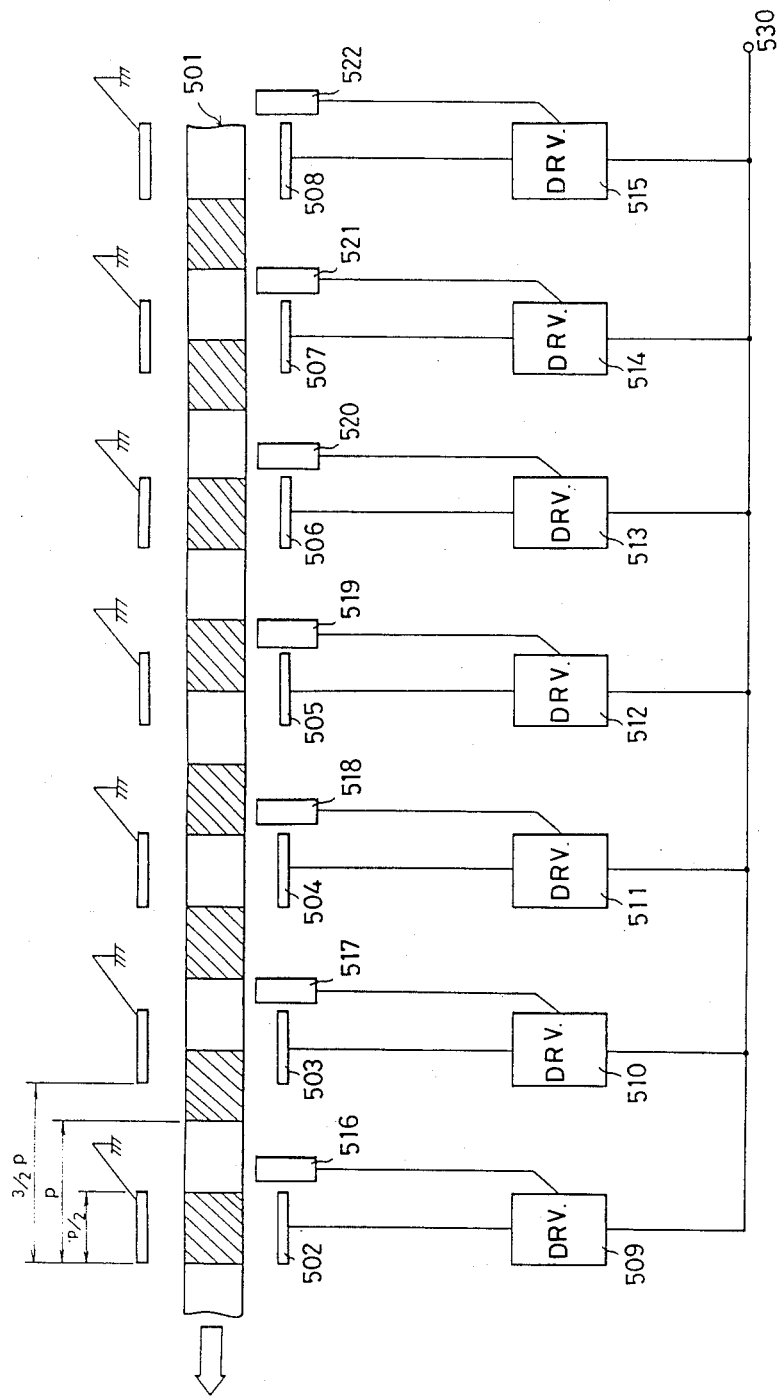
FIGS. 33 to 36 are circuit diagrams of eighteenth to twenty-first embodiments of the invention.

With reference to FIG. 33, this embodiment is an example of control of the electrodes 502 to 508 provided on each side of the dielectric sheet 501 being effected by control of drive circuits 509 to 515 in accordance with the outputs of relative position detection devices 516 to 522 provided on the electrodes for relative position detection.

That is, relative position detection device 516 to 522 control drive circuits 509 to 515 so that when movement is to the left in operation as a motor, motional-effect-producing electrodes positioned where a high-permittivity portion of the actuator is just starting to be drawn therebetween (i.e. electrodes 504, 505 and 508 in the example shown in the figure) are charged, and generational-effect-producing electrodes which are positioned where a low-permittivity portion is about to be drawn therebetween (i.e. electrodes 502, 503, 506 and 507 in the example shown in the figure) are discharged. Also, a control signal 530 is applied to each of the drive circuits, adjusting the output of each drive circuit. The desired driving force is thereby obtained.

When movement to the left is used in operation as a generator, relative position detection devices 516 to 522 control the drive circuits 509 to 515 so that generational-effect-producing electrodes (i.e. electrodes (i.e. electrodes 502, 503, 506 and 507 in the example shown in the figure) are connected to the output busbar and motional-effect-producing electrodes (i.e. electrodes 504, 505 and 508 in the example shown in the figure) are connected to an exciting power source. Also, a control signal 530 is applied to each of the drive circuits, adjusting the output of each drive circuit.

EMBODIMENT 19

Figure 34:
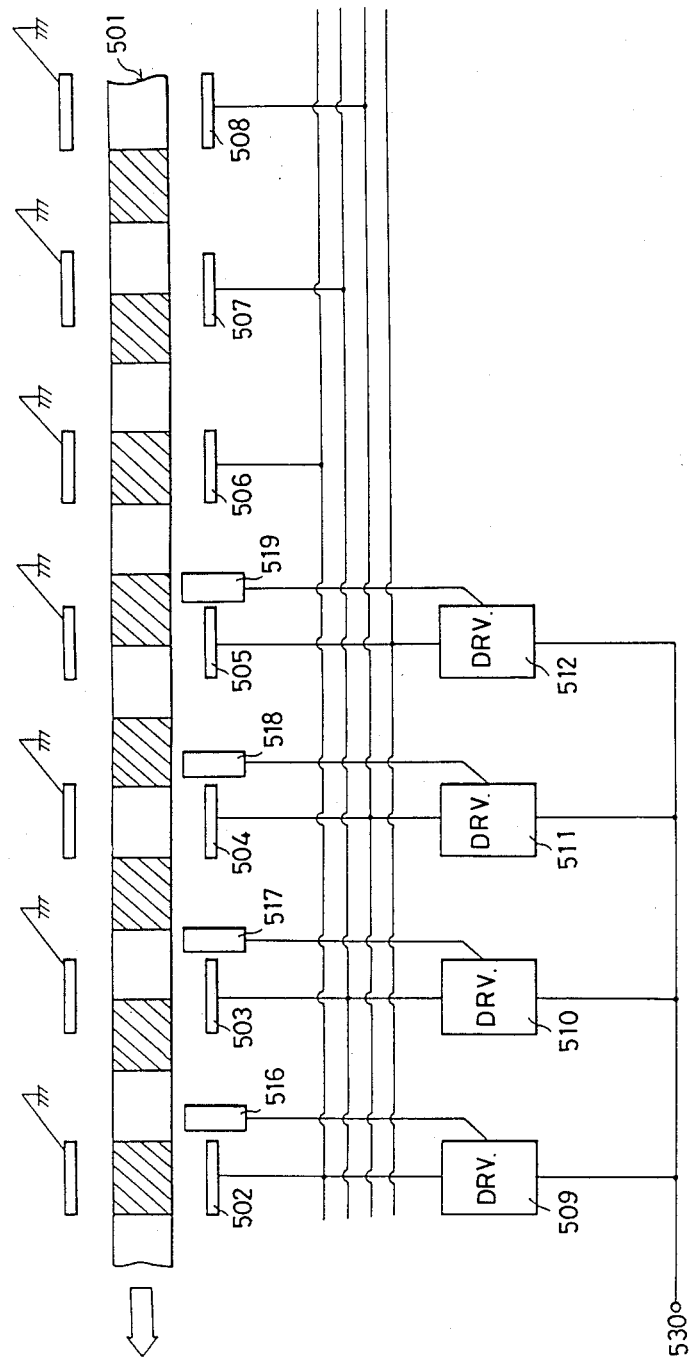

With reference to FIG. 34, this embodiment is an example of control of the electrodes 502 to 508. For a number of the electrodes in the same phase relative to the position of the actuator, control is effected by one of the relative position detection devices 516 to 519 and one of the control drive circuits 509 to 512.

EMBODIMENT 20

Figure 35:
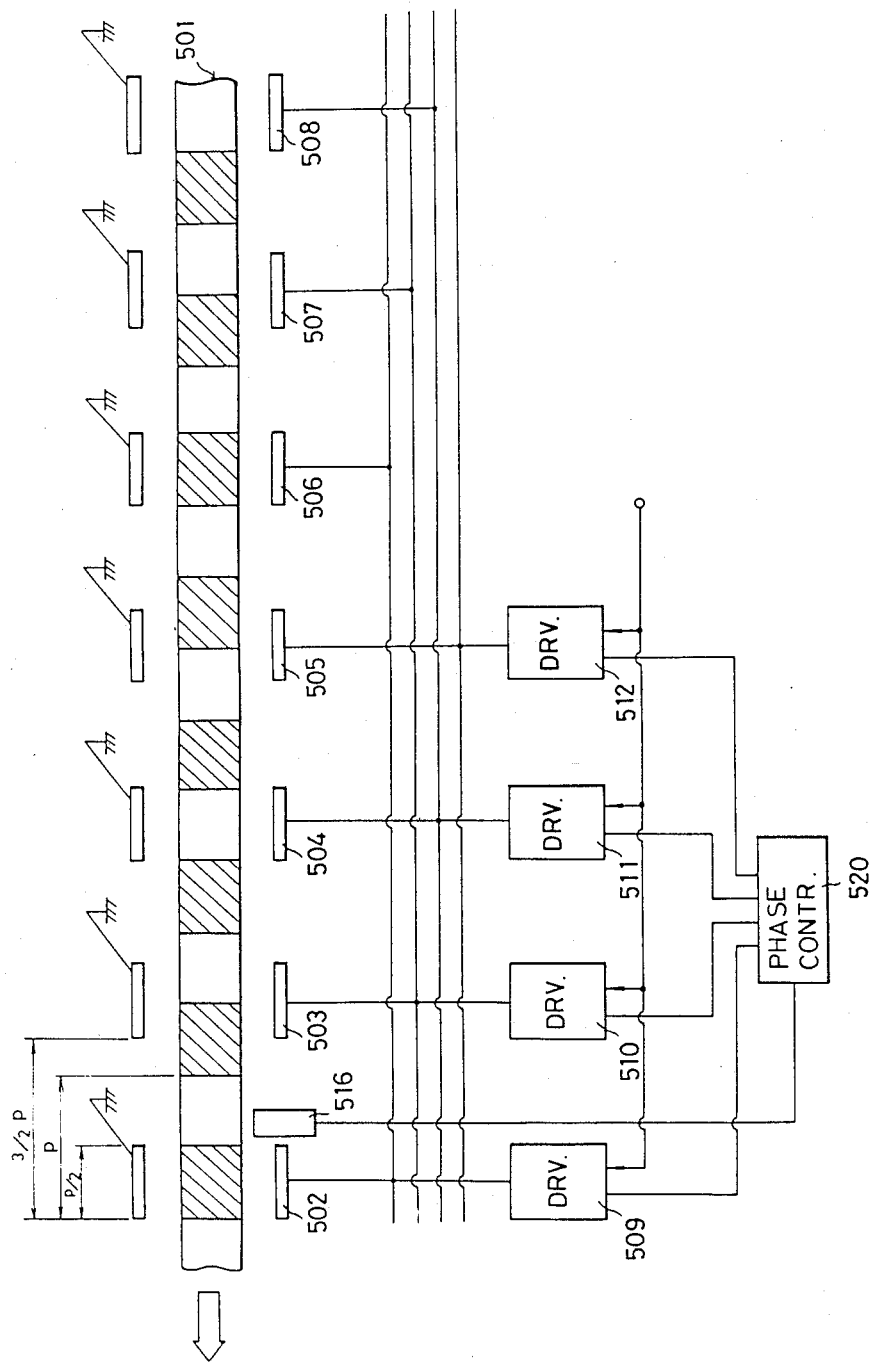

With reference to FIG. 35, in this embodiment, the relative position of the actuator is detected by a single relative position detection device 516, and on the basis of the resulting signal a phase controller 520 effects appropriately timed phase control of the electrodes in the various relative positions.

EMBODIMENT 21

Figure 36:
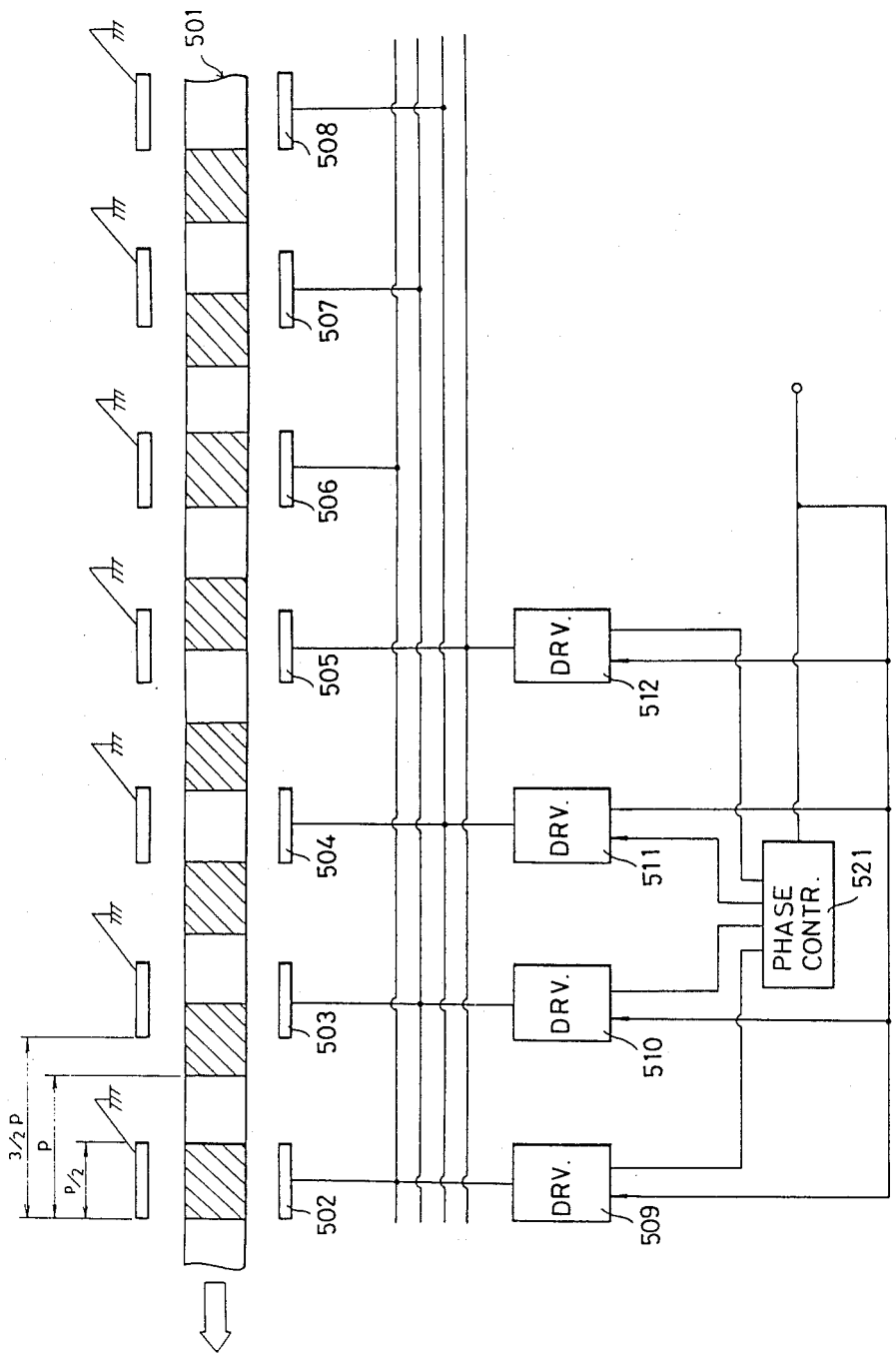

With reference to FIG. 36, in this embodiment, in operation as a motor, all of the electrodes are controlled by a phase controller 521. That is, the phase controller 521 controls the drive circuits 509 to 512 so that voltage is applied in sequence to the adjacent phase electrode at a fixed pitch.

Thus, if for example a voltage is applied to the electrode 505 shown in the figure (and the electrodes in the same phase), the actuator will move $\frac{1}{2}$p to the left, then stop. If voltage is then applied to electrode 504, the actuator will move a further $\frac{1}{2}$p to the left and stop.

If in the same way the voltage is applied to electrode 503, 502, 505, 504, and so forth, the actuator will be moved to the left each time. As well as adjusting the output of drive circuits 509 to 512, the control signal 530 also controls the period of phase controller 521.

In each of the embodiments described in the above, the output can be increased by making the gap between actuator and capacitor (the slip surfaces) 100 micrometers or less and filling this gap with a fluid, so that the dielectric breakdown voltage across the electrodes is greater than the inversely proportional value of the electrode gap.

Also, in each of the embodiments, energy conversion can be effected by varying the distance between electrodes instead of by the charging and discharging of capacitors.

As is clear from the above explanation, in accordance with this invention, at least one pair of capacitors is coupled with an actuator in an appropriate positional relationship, and each capacitor is charged or discharged at an appropriate point, thereby enabling electrical energy to be converted to mechanical energy or mechanical energy to electrical by means of a very simple construction.

In addition, thin-film deposition and photolithography, which are technologies used in the production of semiconductor devices, can be applied to the fabrication, facilitating a compact, high-density structure capable of efficient energy conversion.

In addition, when the construction is for operation as a motor, whether linear or rotary, it is possible to obtain a structure that provides an extremely uniform output, and in the case of a stepping motor extremely fine positional control and also three-dimensional rotary functioning are obtained.

In the case of operation as a generator, together with the above motor, a high output can be obtained from a very compact structure, giving it a broad range of utility in the field of artificial internal organs.

We claim:

1. An energy converting device for converting electrical energy into mechanical energy or mechanical energy into electrical energy, the device comprising:
a plurality of capacitors each having a pair of electrodes and being arranged at a predetermined spacing;
an actuator formed of a dielectric material having high-permittivity and low-permittivity portions alternately arranged at a predetermined pitch, and disposed to be movable relative to each pair of electrodes to change the capacitance of each capacitor due to the change of permittivity within each capacitor caused by the relative movement between the actuator and each pair of electrodes;
detecting means for detecting the position of each capacitor relative to the actuator; and
control means connected to the detecting means and operative when the actuator is displaced to charge or discharge each capacitor in synchronism with the change in the capacitance thereof due to the change in the permittivity thereof caused by the displacement of the actuator relative to each capacitor to effect electrical to mechanical or mechanical to electrical energy conversion.

2. An energy converting device according to claim 1; wherein the positional spacing of the capacitors and the pitch arrangement of the high-permittivity and low-permittivity portions are related to each other.

3. An energy converting device according to claim 2; wherein the control means includes means operative when the electrical energy is converted into the mechanical energy for charging some capacitors which are in a position where the capacitances thereof increase due to the change in the permittivity with the movement of the actuator, and for discharging other capacitors.

4. An energy converting device according to claim 2; wherein electrical energy is converted into the mechanical energy for charging only some capacitors which are in a position where the capacitances thereof increase due to the change in the permittivity with the movement of the actuator, and for discharging other capacitors which are in a position where the capacitances thereof decrease due to the change in the permittivity with the movement of the actuator.

5. An energy converting device according to claim 2; wherein the control means includes means operative when the mechanical energy is converted into the electrical energy for charging capacitors which are in a position where the capacitances thereof decrease due to the change in the permittivity with the movement of the actuator so that the electrical power is then taken off via the electrodes of the capacitors.

6. An energy converting device according to claim 2; wherein the electrodes are each provided with the detecting means and the capacitors are charged or discharged in accordance with the detected relative positions of capacitors and actuator.

7. An energy converting device according to claim 2; wherein each group of capacitors having the same positional phase relative to the actuator is provided with the detecting means and the capacitors are charged or discharged in accordance with the relative positions of the capacitors and actuator.

8. An energy converting device according to claim 2; wherein the detecting means comprises a single detecting means, and the control means includes a phase controller operative on the basis of a signal from the single detecting means for effecting the charging or discharging of all the capacitors arranged in a predetermined position relative to the actuator.

9. An energy converting device according to claim 1; wherein the detecting means comprises a mechanical, optical or magnetic sensor or a sensor that detects the capacitance between the pair of electrodes of the capacitor.

10. An energy converting device according to claim 1; wherein the actuator is bar-shaped, ring-shaped, cylindrical, tubular, flat or ball-shaped.

11. An energy converting device according to claim 1; wherein the dielectric material is comprised of high-permittivity ceramics, high-permittivity polymer or high-permittivity biopolymer.

12. An energy converting device for converting electrical energy into mechanical energy or mechanical energy into electrical energy, the device comprising:
a plurality of capacitors each having a pair of electrodes and being arranged at a predetermined spacing, one of each pair of electrodes being movable relative to the other electrode;
an actuator provided with said one electrodes of the capacitors and disposed to be movable relative to the other electrodes to change the capacitance of the capacitors;
a dielectric material disposed between each pair of electrodes to fix said one electrode of the capacitors;
detecting means for detecting the relative position of the pairs of electrodes; and
control means connected to the detecting means and operative when said one electrodes are displaced relative to the other electrodes to charge or discharge the capacitors in synchronism with the change in capacitance due to the displacement between the pairs of electrodes to thereby effect electrical to mechanical or mechanical to electrical energy conversion.

13. An energy converting device according to claim 12; wherein the dielectric material is arranged to fix the electrodes formed on the actuator.

14. An energy converting device according to claim 12; wherein the dielectric material is comprised of high-permittivity ceramic, high-permittivity polymer or high-permittivity biopolymer.

15. An energy converting device for converting electrical energy into mechanical energy or mechanical energy into electrical energy, the device comprising:
a plurality of capacitors each having a pair of electrodes and being arranged at a predetermined spacing, ones of the pairs of electrodes of the capacitors being movable relative to the others of the pairs of electrodes so as to change the distance between each pair of electrodes when they move relatively;
an actuator provided with said ones of the pairs of electrodes of the capacitors and disposed to be movable relative to the other electrodes to change the capacitance of each capacitor due to the change in distance between each pair of electrodes;
detecting means for detecting the relative position of the pairs of electrodes; and
control means connected to the detecting means and operative when said one electrodes are displaced relative to the other electrodes to charge or discharge the capacitors in synchronism with the change in capacitance due to the change of distance between the pairs of electrodes to thereby effect electrical to mechanical or mechanical to electrical energy conversion.

16. An energy converting device according to claim 15; wherein the distance between the pairs of electrodes changes periodically as both the electrodes move relatively.

17. An energy converting device according to claim 15; wherein each pair of electrodes is provided therebetween with liquid and/or solid dielectric material.

18. An energy converting device according to claim 17; wherein the dielectric material is comprised of high-permittivity ceramics, high-permittivity polymer or high-permittivity biopolymer.

19. An energy conversion device comprising: a pair of spaced apart electrode members; a dielectric member movably disposed between the electrode members to undergo movement in a given direction relative to the electrode members, the dielectric member having a relatively high permittivity portion and a relatively low permittivity portion adjacent to each other in the given direction and coacting with the electrode members to define a variable capacitance whose value depends on and varies according to the position of the dielectric member relative to the electrode members; and means for selectively applying an electrostatic force to the dielectric member to effect movement of the dielectric member in the given direction thereby converting electrical energy to mechanical energy or for selectively moving the dielectric member in the given direction to accordingly vary the capacitance value of the variable capacitance thereby converting mechanical energy to electrical energy.

20. An energy conversion device according to claim 19; wherein the pair of electrode members hold high electric energy when the low permittivity portion is displaced into the spaced electrode members and hold low electric energy when the high permittivity portion is displaced into the spaced electrode members so that the decrease in electric energy is converted into a corresponding increase in mechanical energy.

21. An energy conversion device according to claim 19; wherein the dielectric member has high mechanical energy when the electrode members registers with the high permittivity portion and has low mechanical energy when the electrode members register with the low permittivity portion so that the decrease in the mechanical energy is converted into corresponding increase in the electrical energy.

22. An energy conversion device according to claim 19; wherein said means includes charging and discharging means electrically connected to the pair of electrode members for charging and discharging the variable capacitance to transmit the electrical energy to and from the electrode members, and actuating means mechanically connected to the dielectric member for effecting reversible movement thereof in the given direction and reverse direction to transmit the mechanical energy to the from the dielectric member.

23. An energy conversion device according to claim 22; including detecting means operative during the movement of the dielectric member for detecting position thereof relative to the pair of electrode members, and controlling means responsive to the detection of the dielectric member position for controlling the charging and discharging of the capacitance in synchronization with the reversible movement of the dielectric member.

24. An energy conversion device according to claim 19; wherein the pair of electrode members are divided into a plurality of pairs of electrode segments to constitute a plurality of variable capacitance elements, and the dielectric member has a plurality of high permittivity portions and a plurality of low permittivity portions alternately arranged to each other to define the variable capacitance elements together with the electrode segments.

25. An energy conversion device according to claim 24; wherein the plurality of pairs of electrode segments are aligned at given intervals and the plurality of alternate high and low permittivity portions are aligned at given pitches so as to correlate the pitches with the intervals to thereby phase the conversion in the respective capacitance elements.

26. An energy conversion device according to claim 24; wherein the dielectric member has a plurality of alternate high and low permittivity portions aligned to form a geometric array.

27. An energy conversion device according to claim 19; wherein the dielectric member is composed of a solid dielectric material selected from the group consisting of ceramics, polymer and biopolymer.

* * * * *